United States Patent [19]
Epstein et al.

[11] Patent Number: 5,950,965
[45] Date of Patent: Sep. 14, 1999

[54] SPLIT SHELL SPACECRAFT

[75] Inventors: Kenneth William Epstein, San Jose; Michael Joseph Glogowski, Cupertino; William Glen Imes, Santa Clara; Michael R. Kapolnek, Sunnyvale; Kevin M. Bilger, Mountainview, all of Calif.

[73] Assignee: Lockheed Martin Corporation, Sunnyvale, Calif.

[21] Appl. No.: 08/896,031

[22] Filed: Jul. 17, 1997

[51] Int. Cl.⁶ ........................................................ B64G 1/00
[52] U.S. Cl. ....................................................... 244/158 R
[58] Field of Search ............................. 244/158 R, 118.1, 244/118.2; 220/4.02, 4.21, 4.24; 156/245; 264/258, 297.4, 297.6, 328.7; 249/155; 425/470

[56] References Cited

U.S. PATENT DOCUMENTS

| | | | |
|---|---|---|---|
| 3,709,447 | 1/1973 | Devlin | 244/158 R |
| 3,984,953 | 10/1976 | Kump | 220/4.02 |
| 4,151,976 | 5/1979 | Schurman | 249/155 |
| 5,022,845 | 6/1991 | Charlson et al. | 425/470 |
| 5,411,699 | 5/1995 | Collette et al. | 249/155 |
| 5,522,569 | 6/1996 | Steffy et al. | 244/158 R |
| 5,527,001 | 6/1996 | Stuart . | |
| 5,624,088 | 4/1997 | Fiore | 244/158 R |
| 5,675,123 | 10/1997 | Proctor et al. | 220/4.02 |
| 5,735,489 | 4/1998 | Drolen et al. | 244/158 R |
| 5,755,406 | 5/1998 | Aston et al. | 244/158 R |
| 5,839,696 | 11/1998 | Caplin et al. | 244/158 R |

FOREIGN PATENT DOCUMENTS

| | | | |
|---|---|---|---|
| 2753188 | 6/1978 | Germany | 244/158 R |
| 2091194 | 7/1982 | United Kingdom | 244/158 R |

*Primary Examiner*—Charles T. Jordan
*Assistant Examiner*—Patricia L. Zuniga
*Attorney, Agent, or Firm*—Feix & Feix

[57] ABSTRACT

A modular spacecraft and fabrication method for producing a spacecraft of the kind that forms an enclosure and framework for installation of the external and internal subsystems of the spacecraft. The primary structure of the spacecraft is formed as a split shell enclosure including composite formed upper and lower shell portions. The spacecraft, with the shells open, provides an extremely high degree of access during the assembly, installation and test of the spacecraft. A self-aligning tapered joint is formed at respective contacting lip surfaces of at least one set of common end walls of the upper and lower shell portions. Heat pipes are formed integral within the composite structure of selected walls of the shell portion to provide thermal regulation to the spacecraft and the subsystems contained therein. Removable battery modules are incorporated into the end wall structure of the upper shell portion. Also disclosed is an arrangement for distributing the subsystem electronics over the shell of the spacecraft in a manner that maximizes power, thermal and weight efficiencies. The distributed electronics arrangement includes a number of standardized plug-in interface cards which contain the various subsystem electronics and a common backplane for receiving the interface cards. The common backplane is mounted directly to the composite shell structure and is preferably located over one or more heat pipes for thermal dissipation.

13 Claims, 4 Drawing Sheets

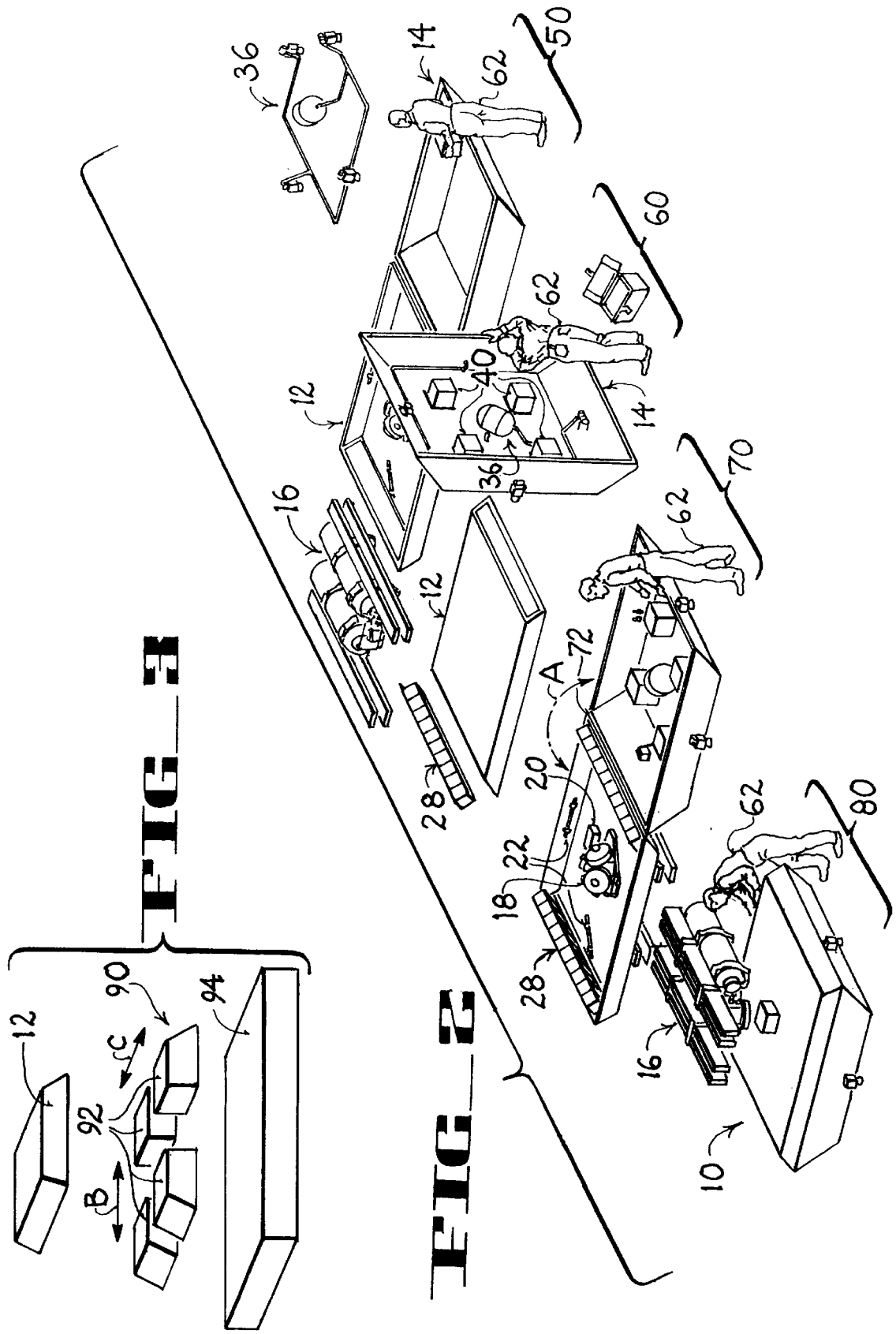

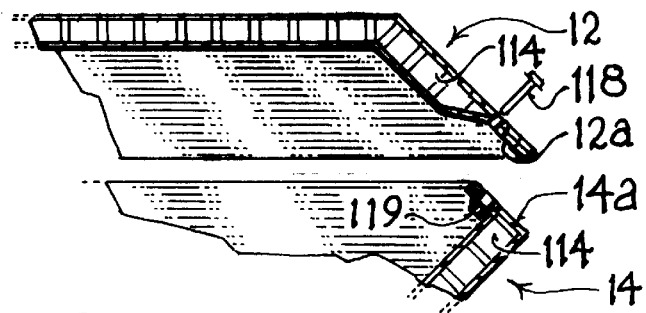
FIG_6
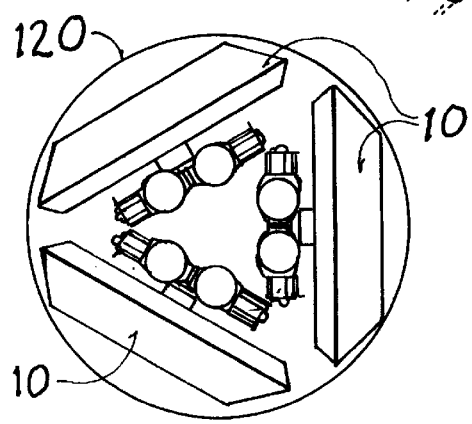
FIG_7
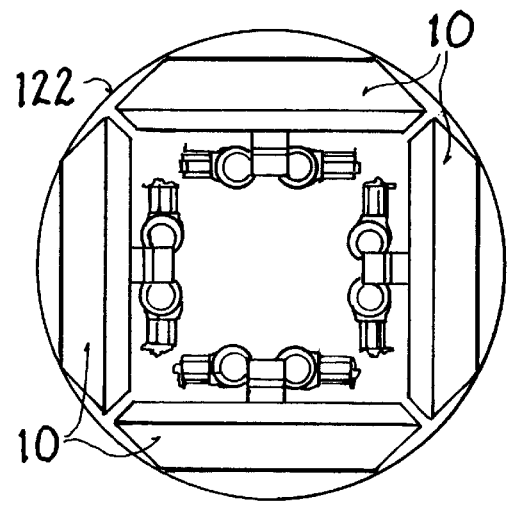
FIG_8
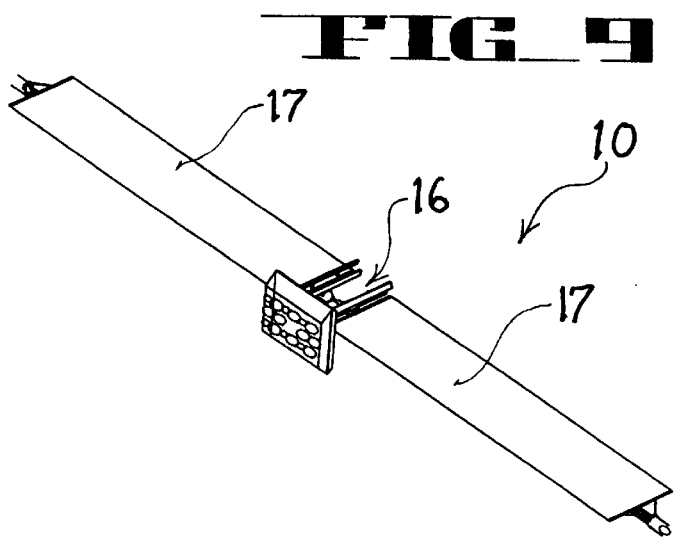
FIG_9

SPLIT SHELL SPACECRAFT

FIELD OF THE INVENTION

The present invention relates to the field of modular spacecraft design. More particularly, this invention relates to a modular spacecraft design and a fabrication and assembling method therefor in which the primary supporting structure of the spacecraft is formed from composite materials as a split shell enclosure that allows full access to every subsystem of the modular spacecraft during installation and testing of the spacecraft.

BACKGROUND OF THE INVENTION

Current state of the art spacecraft fabrication and assembly techniques use a high degree of composites. Composites offer many advantages over the metallic materials commonly used in the primary supporting structure of conventional spacecraft designs. A key benefit of composites is that they can provide significant weight reductions in the final product. Composites are more easily fashioned into structural pieces of complex geometry (e.g. rounded surfaces, irregular profiles, etc.), and thus extensive use of composites can help to reduce part count as well as reduce the number of mechanical fasteners that are required to secure the parts or structural pieces together.

Examples of state of the art modular spacecraft that utilize a high degree of composites include the A2100 satellite and the IRIDIUM® Bus, both designed and built by the Lockheed Martin Corporation. In these known satellite designs, the major structural components are assembled from composite parts and bolted together, including a series of access panels. In order to reduce weight, composites are used for the spacecraft.

Although such state of the art spacecraft designs have made great strides in reducing part count and weight, the use of composites in these spacecraft designs still relies heavily on geometry and joint methods from traditional metal fabrication and assembly techniques. The result is that these spacecraft designs do not take full advantage of the benefits of working with composites. It is well understood that the efficiency of composites is decreased as the number of fasteners and discontinuous joints are increased in the completed structure.

To obtain the maximum benefits of composites, spacecraft designers must rethink the way they fabricate and assemble the major structural components of spacecraft. A continuous primary structure having a minimum number of bolt together fasteners would be a more efficient use of composites. Of course, a continuous composite containment structure for satellite primary structure fabrication is of little benefit if it does not permit good access to the spacecraft interior for installation and testing of the spacecraft subsystems prior to launch.

Inadequate or limited access to the spacecraft interior is a problem associated with most state of the art modular spacecraft designs. A case in point is the installation procedure that is required for installing the propulsion subsystem in the A2100 and IRIDIUM® spacecraft. In view of the limited access to the spacecraft interior, and further in view of the presence of other pre-installed subsystems, the propulsion subsystem must be installed as a number of subassemblies, each of size small enough to fit within the access panel openings. Once the propulsion system subassemblies are inside the access panels, they must be maneuvered around the other pre-installed subsystems into their assigned locations. The various subassemblies of the propulsion subsystem are then welded together in place. Field welding of this nature is both costly and time intensive since it must be done in a clean room environment and it further requires use of special portable welding apparatus so as not to compromise the other subsystems of the spacecraft.

Much greater manufacturing and assembling efficiencies could be realized if the propulsion subsystem could be installed within the spacecraft as a fully assembled unit.

Accordingly, a modular spacecraft fabrication and assembling method that reduces part count and number of fasteners that can also provide a structural geometry that enables full and unimpeded access to the various subsystems of the spacecraft during assembly, installation and testing would constitute a significant advancement.

The major subsystems of current spacecraft requires substantial electronics. In accordance with the conventional practice, a dedicated box of electronics is provided for each subsystem (e.g. guidance, navigation and control, command, data handling, power, propulsion, communications, thermal, etc.). The dedicated boxes are connected to each other by a series of cables. In view of the limited amount of space available within the spacecraft, the boxes are not always optimally located near their dedicated subsystems.

Further, there is significant electronic duplication associated with the dedicated box approach as each dedicated box requires a certain amount of electronics common to all dedicated boxes, such as electronics for general housekeeping functions, power supply and the like. In view of the many dedicated boxes used in a typical spacecraft and the amount of cabling required to connect all the various dedicated boxes, there are significant weight and volume penalties associated with the dedicated box approach. Also, the extra cabling introduces inefficiencies in power and signal strength.

It would be desirable to redistribute the subsystem electronics within the spacecraft in a way that reduces duplication of function and that also reduces the amount of cabling required so that a greater weight savings could be realized and power and signal loss could be minimized and thermal dissipation efficiency can be maximized.

As is well known from the PCI architecture prevalent in personal computers, electronic components can be designed as integrated circuits on standardized interface cards which, in turn, plug into a common backplane or motherboard. The improvements in performance and diagnostic advantages associated with the plug and play approach of the PCI architecture are well understood.

It would be desirable to incorporate a similar plug and play philosophy to the arrangement of the subsystem electronics on a spacecraft. More particularly, it would be desirable to arrange the electronics of the various subsystems of the spacecraft in a distributed fashion on a common backplane in a way which maximizes power, thermal and weight efficiencies.

In satellite development, a significant portion of the total cost is due to electronics qualification. The electronics must be qualified to withstand all the environmental factors associated with the space launch, such as vibration, acoustics, flame, smoke, acceleration forces, etc. In addition, the electronics must be qualified to withstand the environmental factors associated with operation in space, namely, radiation and electromagnetic interference (EMI). On top of all this, the electronics of a spacecraft must be qualified for reliable long term operation (e.g. 10–15 years) without failure.

Accordingly, a distributed electronics architecture for a spacecraft that is easily and economically space-qualified would constitute another significant advance in the art.

SUMMARY OF THE INVENTION

This application is, directed to a modular spacecraft fabrication and assembling method for producing a spacecraft of the kind that forms an enclosure and framework for receiving the external and internal subsystems of the spacecraft. The primary structure of the spacecraft is formed as a split shell enclosure comprising upper and lower shell portions. The spacecraft, with the shells open, provides an extremely high degree of access during the assembly and test phases of the spacecraft subsystems.

The upper and lower shell portions are each constructed from composite materials. The upper and lower shell portions are joined together along a common tapered joint. The tapered joint is specially configured to be self-aligning. The tapered joint ensures a high degree of alignment at a relatively low manufacturing cost without the need for expensive hard tooling for coordinated facing and drilling operations between the two shell portions.

By reducing the primary structure of the spacecraft to two continuous shell shaped composite pieces, a significant reduction in the spacecraft part count is realized. Also, higher weight reductions are achieved through higher use of continuous load paths. The reduction in the number of mechanical joints and fasteners that are needed will achieve a lower amount of touch labor and will increase the amount of robotic manufacturing process thus reducing the cost of the spacecraft.

In accordance with an advantageous feature of the invention, modularity and flexibility of the size of the spacecraft are built into the tooling rather than the current practice of building it into the spacecraft structure. The spacecraft shell portions are formed over reusable, modular, and recombinable tooling. The tooling comprises a primary mandrel having an outer surface configuration that forms the inner surface configuration of the shell portions. A lay up of composite materials is arranged over the primary tooling and is cured in place. Each primary mandrel is composed of a plurality of submandrels, preferably four in number, that are arranged in side by side fashion to form the adjoining quadrants of the larger primary mandrel. Additional spacer submandrels may be interposed between four quadrant submandrels in order to increase the length and/or width dimension of the primary mandrel as desired, thereby providing for flexibility in the size of the tooling for producing half shell enclosures of varying sizes. The feature of tooling flexibility prevents the weight penalty for a modular design being introduced to an individual spacecraft (e.g. satellite) program. Separate tooling of differing depth dimensions may be used for forming the upper and lower shell portions of the primary structure depending on mission requirements.

As compared to the known modular spacecraft fabrication and assembling techniques that require significant touch labor in view of the dedicated tooling and assembly fixtures they use, the fabrication and assembling method of the present invention advantageously provides for significant reductions in cost and touch labor requirements. The present invention also facilitates greater flexibility in both small and large scale production through use of numerical controlled (NC) machines for tape and fabric laying and electron beam curing of the composite shell structures. Further, the modularity of the dedicated tooling of the present invention permits growth and flexibility.

The invention also discloses a modular approach to the integration of the spacecraft electronics within the split shell enclosure whereby modularity occurs at a card level as opposed to the box level approach of the prior art. The electronics of the various subsystems are placed on individual standardized card interfaces that plug into slots on one or more common back planes that are mounted directly to the broad flat surface of one or both of the upper and lower shell portions. A series of standardized card interfaces are assigned for the guidance, navigation, control, command, propulsion, communications, and thermal subsystems.

The electrical interfaces between the upper and lower shell portions is advantageously located along a fold line adjacent the tapered joint that connects the upper and lower shell portions. This feature permits complete vehicle check out (with the exception of the mechanical fasteners between the upper and lower shell portions) to occur while maintaining access to all electronic and critical components.

The high degree of access to the spacecraft interior afforded by the split shell design allows the propulsion system to be dropped into the split open structure as a complete welded assembly. Also, in view of the high accessibility of this design, assembly and test time are reduced. This significantly reduces recurring costs and launch costs due to shorter production, test, and launch campaign schedules.

In view of the modular nature of the tooling and the distributed electronics approach, thermal control systems such as heat pipes and the like, may be integrated into some or all of the walls of the composite shell structure for optimized thermal control of the subsystem electronics. Similarly, battery radiators may also be integrated into the one or more side walls of the half shell structure to further reduce weight and costs of the integrated split shell spacecraft.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 2 is an perspective view illustrating a sequence of assembly stages of the split shell spacecraft of the present invention.

FIG. 3 is a perspective view which illustrates the modular tooling that is used for fabricating the shell portions of the split shell spacecraft.

FIG. 6 is an enlarged fragmentary section view which illustrates the self-aligning tapered joint located between the upper and lower shell portions.

FIG. 7 is a top cut away view of a launch fairing (Atlas fairing) with a payload of split shell spacecraft of the present invention.

FIG. 8 is a top cut away view of a launch fairing (Proton fairing) with a payload of split shell spacecraft of the present invention.

FIG. 9 is an illustration of the split shell spacecraft shown with the antennae array in the fully deployed position.

DETAILED DESCRIPTION OF THE PREFERRED EMBODIMENTS

Figure 1:
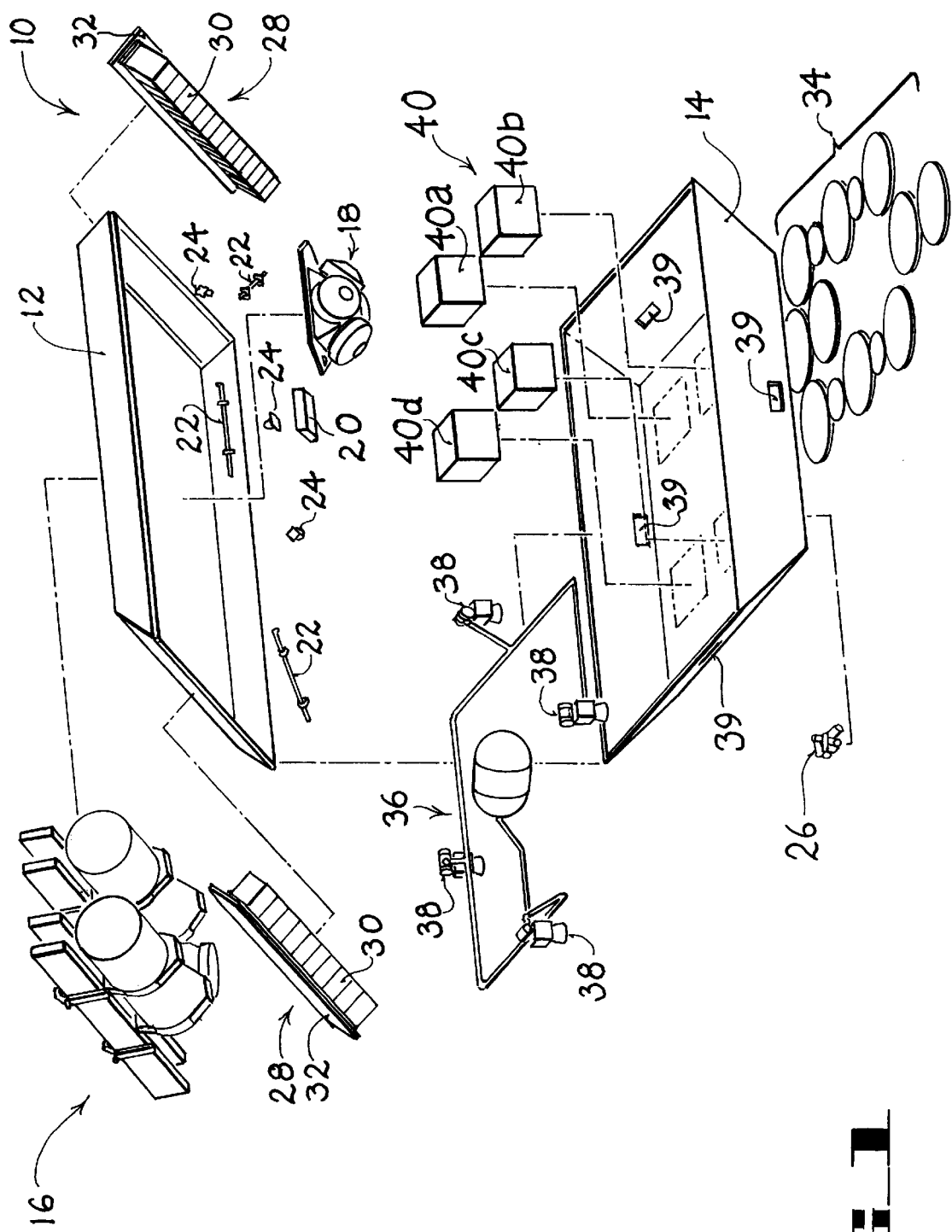
FIG. 1 is an exploded perspective view of the split shell spacecraft of the present invention.

An exploded perspective view of a split shell spacecraft constructed in accordance with one embodiment of the present invention is indicated generally by the reference numeral 10 in FIG. 1.

The primary structure of the split shell spacecraft 10 comprises two pieces, namely upper shell portion 12 and lower shell portion 14. The upper and lower shell portions 12, 14 are generally half shell shape in configuration and they are combinable to form an enclosure and framework for receiving and/or containing the external and internal spacecraft subsystems.

Solar array 16, shown in a folded stowed position, mounts to the outer surface of the upper shell portion 12. Various components of the Guidance Navigation & Control (GNC) subsystem are contained within the upper shell portion 12. These components include reaction wheel assembly 18, Inertial Measurement Unit (IMU) 20, torque rods 22, and magnomometers 24. Another component of the GNC, earth/horizon sensor 26, is shown located on the outer surface of the lower shell portion 14.

The end walls of the upper shell portion 12 are provided with removable battery modules 28. Each battery module 28 includes a battery 30 and a support panel 32. The support panels 32 are formed integral with the upper shell structure 12 and are then cut to size to provide a support structure for the batteries 30. In a preferred embodiment, heat pipes are integrated into the battery support panel structure 32 to provide thermal control for the batteries 30 (the integration of thermal systems within the structure of the half shell portions is described in more detail below with reference to FIG. 5). In this way, the panel structures 32 serve as both support structure and radiators for the batteries 30. The above-described integrated approach eliminates the typical requirement for dedicated support structure for the batteries as well as secondary structure for radiator to battery interfaces and battery/radiator assembly secondary brackets and mounts to the primary structure.

Antennas 34 are provided to the outer surface of the lower shell portion 14. The propulsion subsystem 36 as well as the electronics for the various subsystems (designated generally by reference numeral 40) are contained within the interior space of the lower shell portion 14. The side and end walls of the lower shell portion are provided with holes 39 to accommodate the thrusters 38 of the propulsion subsystem 36.

FIG. 2 illustrates the assembly sequence for the split shell spacecraft of the present invention. The split shell spacecraft 10, with the upper and lower shell portions 12, 14 split open, provides a high degree of access for installing and testing the various spacecraft subsystems.

As is seen at the bracketed region designated by reference numeral 50, the high accessibility of the split shell spacecraft 10 permits the propulsion system 36 to be installed within the lower shell portion 14 as a complete welded assembly. Thus, no welding is required during final assembly or check out. In this way, the propulsion systems could be made as a Line Replaceable Unite (LRU). This reduces costs for final assembly and increases the flexibility during final checkouts, fueling, and pressurization operations. No expensive field welding operations are needed with the present invention.

As is seen at the bracketed region designated by reference numeral 60, the lower shell portion 14 may be tilted upwards during assembly to allow easy access by a technician 62 for installing and testing the subsystem electronics 40. At the same time, power systems such as the battery modules 28 may be installed in the end walls of the upper shell portion 12.

As is seen at the bracketed region designated by reference numeral 70, the upper shell portion 12 is connected to the lower shell portion 14 along a tapered joint 72. The tapered joint 72 allows the two shell portions 12 and 14 to pivot open a full 180 degrees (indicated generally by directional arrow A). Thus, the design of the split shell spacecraft 10 allows the two shell portions 12 and 14 to be split fully open for full access while running tests of subsystems of the spacecraft during final check out. All electrical interfaces between the two shell portions are preferably located along the tapered joint region. Flat Ribbon cable connectors may be used so that all electrical connection can be maintained in the event that the shell portions 12 and 14 need to be opened after final assembly (generally designated at bracketed region 80). The tapered joint is described in greater detail below with reference to FIG. 6.

FIG. 3 illustrates, by way of example, the modular tooling 90 used to form the upper shell portion 12. It is understood that separate modular tooling (not shown) may be used to form the lower shell portion 14 if the lower shell portion 14 is to have a configuration (i.e., depth or volume) that differs from the upper shell portion 12.

The tooling 90 forms a primary mandrel over which a lay up of composite materials can be arranged and cured in place to form the shell portion 12. The tooling 90 comprises a plurality of submandrels 92, preferably four in number, that are arranged in quadrant fashion (as shown) and are bolted in place to a work surface 94. The routine composite formation tasks of tape and fabric laying and curing can be performed by numerical controlled (NC) machines in order to keep the touch labor by assembly technicians to a minimum.

The multi-submandrel tooling approach described above is very flexible and allows for dimensional changes in the formation of the shell portion by simply increasing the longitudinal and/or width dimension of the tooling 90. This is done by moving the four submandrels 92 apart (movement being indicated by longitudinal and transverse directional arrows B and C, respectively) and interposing spacer submandrels (not shown) as appropriate between the spaced apart submandrels 92.

Figure 4:
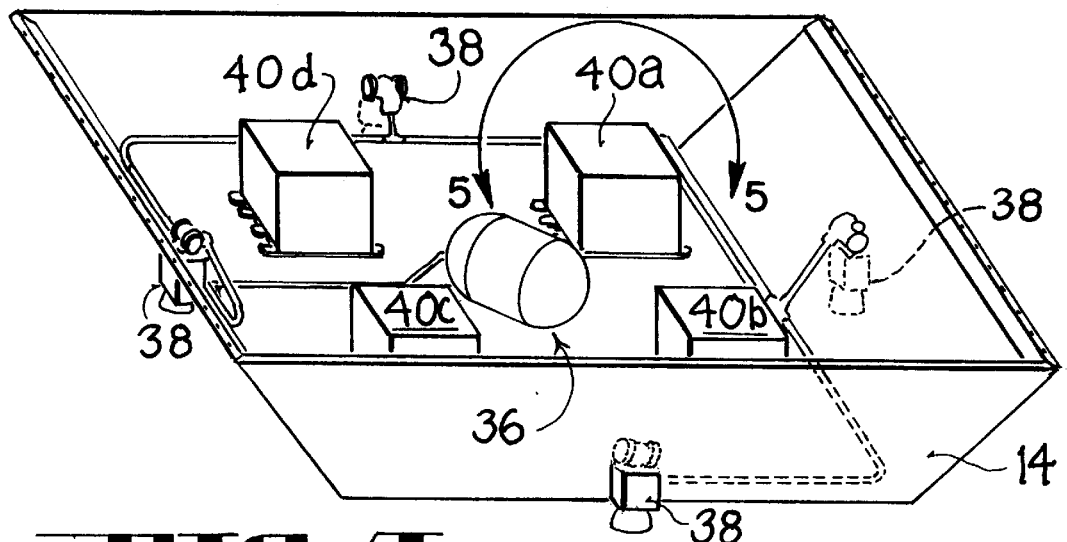
FIG. 4 is an perspective view of the lower shell portion of the split shell enclosure as shown installed with the propulsion subsystem and certain of the various electronic subsystems.

FIG. 4 is a perspective view of the lower shell portion 14 which shows the propulsion subsystem 36 and the electronics 40 (configured as four electronics modules 40a–d) in their assembled positions.

Figure 5:
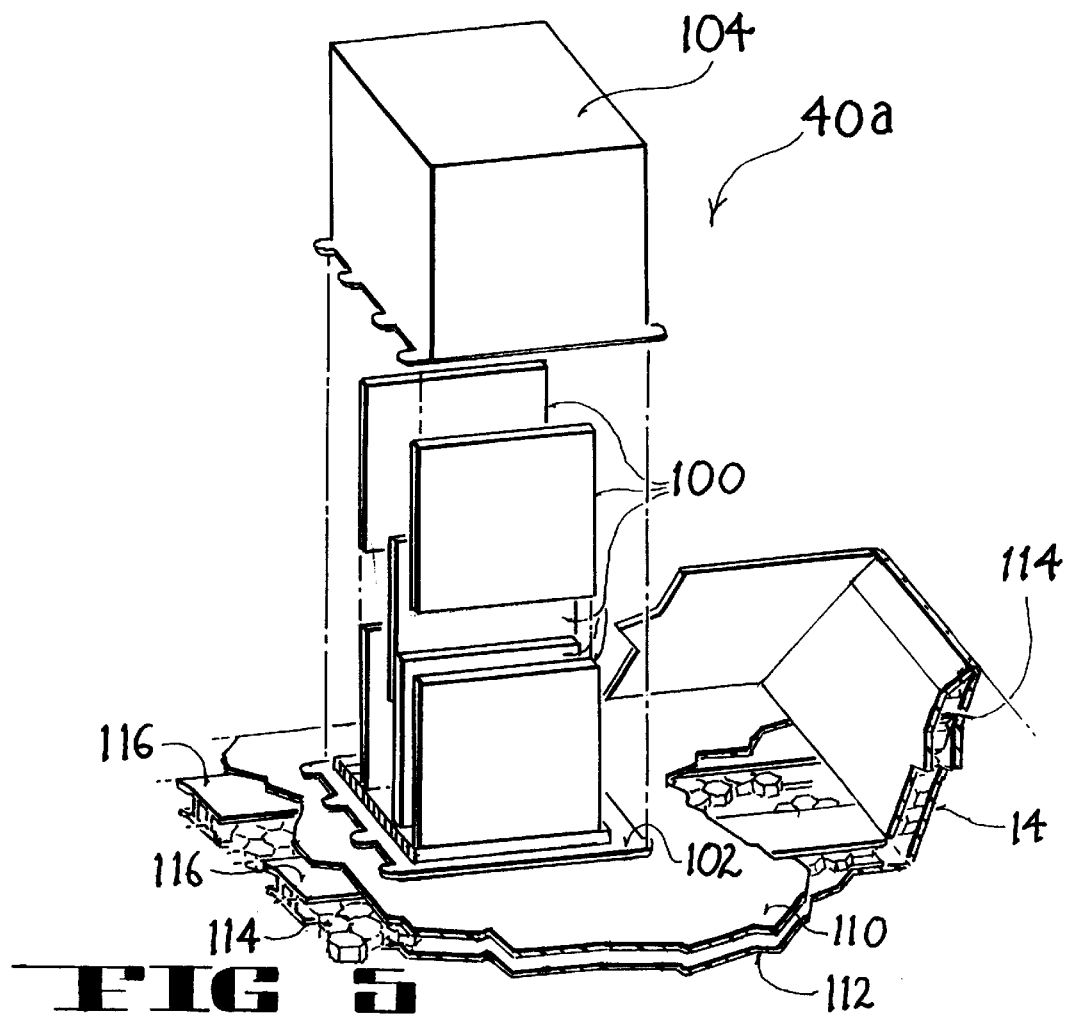
FIG. 5 is an enlarged view of the region encircled by arrows 5—5 of FIG. 4 illustrating the distributed electronics and the construction details of the lower composite formed shell portion.

With reference to the exemplary electronics module 40a depicted in FIG. 5, the electronics of the various spacecraft subsystems are distributed on the lower shell portion 14 of the spacecraft. Electronics module 40a comprises a number of integrated circuit boards or cards 100 that interface to a common backplane 102 disposed on the inner bottom wall of the lower shell portion 14. The common backplane 102 is preferably formed of a material that is able to dissipate heat well, such as aluminum. A series of standard card interfaces are provided for guidance, navigation, control, data handling, power, propulsion and communication functions. The electronics module 40a further includes a light weight cover 104 to provide a shield for the enclosed interface cards 100 for operation in EMI and radiation environments. The cover 104 may be formed from metallic or composite materials and is preferably coated with a suitable shielding material.

FIG. 5 also shows the construction detail of the composite formed bottom or main wall and end wall of the lower shell portion 14. The bottom composite wall includes top and bottom graphite epoxy sheets 110 and 112 which enclose an aluminum honeycomb core 114. Heat pipes 116 are integrated into the honeycomb core at optimized locations to provide thermal cooling for the electronics modules 40a–d. Similar heat pipe structure may be integrated into other walls of the upper and lower shell portions as desired to provide thermal regulation for the enclosed subsystems, such as the end wall structure of the upper shell portion 12 which must provide heat regulation for the heat producing battery modules 28.

In the embodiment shown, the electronics 40 of the various subsystems are organized into four electronics modules 40a–d. It is understood, however, that the arrangement of the distributed electronics into the four electronics modules 40a–d shown should not be construed as a limitation or requirement of the invention, but rather as a one arrangement for efficient use of available real estate on the bottom or floor surface of the lower shell portion 14. In this way, the electronics can be distributed over the bottom surface of the lower shell portion at locations nearest their respective subsystems so that excess cabling and signal loss is avoided. For example, depending on the amount of flat real estate available, the entire electronics of the various spacecraft subsystems could be arranged, if desired, so as to be contained within a single electronics module so that all interface cards are distributed over a single common backplane and are contained within a single cover.

FIG. 6 illustrates the self-aligning tapered joint feature of the present invention. In accordance with this feature, the bottom edge 12a of each end wall of upper shell portion 12 is tapered downwardly and outwardly. The top edge 14a of each end wall of lower shell portion 14 is conformingly tapered to match the taper of the bottom edge 12a of each end wall of upper shell portion 12 so that the two shell portions settle into a perfect alignment as the upper shell portion 12 is lowered into position on top of the lower shell portion 14. One or more fastener assemblies (fastener 118 and nut plate 119) are provided to secure the tapered joint between the two shell portions. The fastener assemblies can be unfastened to permit opening of the split shell spacecraft to permit inspection, testing and/or replacement of subsystem components. The self-aligning tapered joint feature described above reduces touch labor costs and manufacturing costs. since coordinated alignment, facing and drilling operations are unnecessary.

In the embodiment shown and described, the tapered joint is formed along the mutually adjoining end walls of the two shell portions. In accordance with another embodiment of the invention (not shown), the tapered joint is provided along the perimeter edges of both the end and side walls of the two shell portions.

FIG. 7 is a top cut away view (in schematic fashion) of a small diameter launch fairing 120 with a payload of split shell spacecraft 10. The launch fairing 120 shown here is the well known Atlas fairing. The unique geometry of the split shell design of the present invention allows a large quantity of split shell spacecraft 10 to be placed within a launch fairing of constrained volume requirements.

FIG. 8 is a top cut away view (in schematic fashion) of a larger diameter launch fairing 122 with a payload of split shell spacecraft 10. The larger diameter launch fairing 122 shown here is the well known Proton fairing. Again, as seen here the unique geometry of the split shell spacecraft design of the present invention allows stacking in a space efficient manner for efficient use of payload volume for various commonly used launch fairings.

FIG. 9 is an illustration of the split shell spacecraft 10 in a deployed position with solar panels 17 fully extended, after having been launched from the launch fairing 120 or 122.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method of producing a modular spacecraft structure of the kind that forms an enclosure and framework for installation of the external and internal subsystems of the spacecraft, said method allows improved access to all subsystems of the spacecraft during assembly, installation and test phases of the spacecraft production, said method comprising the steps of:

forming a spacecraft supporting shell structure as upper and lower spacecraft shell portions, each of the upper and lower shell portions including a substantially flat main wall and opposed side and end walls;

forming mutually conforming tapers at respective contacting edge surfaces of at least one set of common end walls of the upper and lower shell portions, the mutually conforming tapers permit the shell portions to settle into a desired alignment as the upper shell portion is lowered onto the lower shell portion;

releasably fastening with a fastener assembly the upper and lower shell portions at the tapered joint, the fastener assembly when unfastened permitting movement of the upper and lower shell portions from a first, closed open position, to a second, split open position; and moving the upper and lower shell portions into the split open position to facilitate access to all interior subsystems of the spacecraft during installation and test phases of the spacecraft production.

2. A method as recited in claim 1, wherein the step of forming the upper and lower shell portions includes the steps of:

providing a tooling member for each shell portion, each tooling member comprising a primary mandrel having a generally convex outer surface configured to match a desired inner surface configuration of its respective upper and lower shell portion;

depositing a lay up of composites over each primary mandrel; and curing the lay up of composites in place to form the upper and lower shell portions as continuous shell structures each having smooth and flowing transitions between respective flat main walls and upstanding side and end walls.

3. A method as recited in claim 2, which includes the step of integrating heat pipes into the lay up of composites to provide thermal regulation to the shell structure of said spacecraft.

4. A method as recited in claim 2, wherein each of said primary mandrels is modular, being separable along longitudinal and transverse axes into four submandrel sections; the method further including the steps of:

separating each of said primary mandrels along at least one of its longitudinal and transverse axes; and interposing spacer submandrel sections between the separated submandrel sections to provide an enlarged primary mandrel over which upper and lower shell portions of increased length and/or width may be formed.

5. A method as recited in claim 3, wherein the heat pipes are formed integral with the flat main wall of the lower shell portion, and wherein the method further includes the step of installing electronic subsystems on the interior surface of the flat main wall of the lower shell portion adjacent the integrated heat pipes.

6. A method as recited in claim 1, which includes the steps of:

installing a propulsion subsystem within the hollow interior of the lower shell portion as a complete welded assembly; and forming holes in the side and end walls of the lower shell portion to accommodate thruster components of the propulsion subsystem.

7. A method as recited in claim 3, which further includes the steps of:

integrating heat pipes into the composite structure of the end walls of the upper shell portion;

forming removable panel portions in the end walls of the upper shell portions; and supporting batteries on the removable panel portions in the end walls of the upper shell portion so that the removable panels serve a dual purpose as a battery supports and battery radiators.

8. A method as recited in claim 3, which further includes the step of distributing subsystem electronics of the spacecraft over the interior surface of at least one of the upper and lower shell portions to maximize power, thermal and weight efficiencies, the step of distributing the subsystem electronics includes the steps of:

placing the subsystem electronics on standardized plug-in interface cards;

mounting at least one common back plane directly to an interior surface of one of said upper and lower shell portions located adjacent to the integrated heat pipes, said backplane having a number of expansion slots for receiving the plug-in interface cards; and enclosing the backplane and plug-in interface cards with a cover that is shielded for operation in EMI and radiation environments.

9. A modular spacecraft of the kind having a supporting structure that forms an enclosure and framework for installation of the external and internal subsystems of the spacecraft, the modular spacecraft allowing full access to all subsystems of the spacecraft during installation and testing of the subsystems, the modular space craft comprising:

a two piece split shell primary spacecraft supporting structure including a composite formed upper shell portion and a composite formed lower shell portion, each of said upper and lower shell portions including a substantially flat main wall and opposed side and end walls with smooth and continuous transitions between said flat main wall and opposed side and end walls; and hinge fastener means for fastening together said upper and lower shell portions, said hinge fastener means permitting movement of the upper and lower shell portions between a first, split open position for allowing full access to interior portions of said upper and lower shell portions, and a second, closed position.

10. A modular spacecraft as recited in claim 9, which includes heat pipes formed integral within selected walls of the composite formed upper and lower shell portions.

11. A modular spacecraft as recited in claim 10, which includes plural battery modules, each of said battery modules comprising:

a battery;

a support panel for supporting said battery, said support panel comprising a composite structure formed integral with an end wall of said upper shell portion; and said panel including integral heat pipes to radiate and dissipate heat produced by said battery to adjacent walls of the upper shell portion.

12. A modular spacecraft as recited in claim 10, wherein said support panels are removable from said upper shell portion.

13. A modular spacecraft as recited in claim 12, wherein:

said heat pipes are formed integral with said flat main wall of said lower shell portion, and wherein said modular spacecraft further includes:

a distributed arrangement of subsystem electronics disposed on said lower shell portion to maximize power, thermal and weight efficiencies which includes:

a plurality of standardized plug-in interface cards containing the electronics for the various subsystems of the spacecraft;

a common backplane mounted directly to an interior surface of said flat main wall of said lower shell portion adjacent said heat pipes;

said common backplane including a plurality of expansion slots for receiving said plug-on interface cards; and a cover for enclosing said common backplane and interface cards, said cover being shielded for operation in EMI and radiation environments.

* * * * *